US009471582B2

(12) United States Patent
Gunda et al.

(10) Patent No.: US 9,471,582 B2
(45) Date of Patent: Oct. 18, 2016

(54) OPTIMIZED PRE-FETCH ORDERING USING DE-DUPLICATION INFORMATION TO ENHANCE NETWORK PERFORMANCE

(71) Applicant: International Business Machines Corporation, Armonk, NY (US)

(72) Inventors: Kalyan C. Gunda, Bangalore (IN); Mukti Jain, Pune (IN); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 13/856,478

(22) Filed: Apr. 4, 2013

(65) Prior Publication Data

US 2014/0304268 A1    Oct. 9, 2014

(51) Int. Cl.
 *G06F 17/30* (2006.01)
(52) U.S. Cl.
 CPC ............. *G06F 17/30132* (2013.01)
(58) Field of Classification Search
 CPC .................................. G06F 17/30132
 USPC ............................... 707/738, 692
 See application file for complete search history.

(56) References Cited

U.S. PATENT DOCUMENTS

| | | | |
|---|---|---|---|
| 6,687,786 B1 * | 2/2004 | Wong ................ | G06F 12/023 365/49.17 |
| 7,523,098 B2 | 4/2009 | Hirsch et al. | |
| 8,078,593 B1 | 12/2011 | Ramarao | |
| 8,209,291 B1 | 6/2012 | Ma et al. | |
| 8,442,956 B2 * | 5/2013 | Tofano ............. | G06F 17/30489 707/692 |
| 2007/0203940 A1 * | 8/2007 | Wang ................ | G06F 17/30864 707/103 |
| 2008/0244172 A1 | 10/2008 | Kano | |
| 2008/0281908 A1 | 11/2008 | McCanne et al. | |
| 2009/0327479 A1 | 12/2009 | Zavalkovsky et al. | |
| 2011/0218972 A1 * | 9/2011 | Tofano ............. | G06F 17/30159 707/692 |
| 2011/0238775 A1 | 9/2011 | Wu et al. | |
| 2011/0258161 A1 | 10/2011 | Constantinescu et al. | |

FOREIGN PATENT DOCUMENTS

EP    2222025 B1    2/2012

OTHER PUBLICATIONS

"Data deduplication", <http://en.wikipedia.org/w/index.php?title=Data_deduplication&printable=yes>, Printed Jan. 15, 2013.
Griffioen et al., "Automatic Prefetching in a WAN", Technical Report #CS243-93, Appeared in the IEEE Workshop on Advances in Parallel and Distributed Systems, Oct. 1993.
Griffioen et al., "Reducing File System Latency using a Predictive Approach", <http://protocols.netlab.uky.edu/~griff/papers/usenix94.pdf> Printed Jan. 14, 2013.
"WAN Deduplication: Getting More by Sending Less", Copyright 2008 Silver Peak Systems, Inc., White Paper, <www.silver-peak.com>.
"WAN Optimization Technologies in EMC Symmetrix Replication Environments", White Paper, Jan. 2009, pp. 1-11, Copyright 2009 EMC Corporation.
Svobodova, "File Servers for Network-Based Distributed Systems", Computing Surveys, vol. 16, No. 4, Dec. 1984, pp. 353-398.

\* cited by examiner

*Primary Examiner* — Apu Mofiz
*Assistant Examiner* — Chelcie Daye
(74) *Attorney, Agent, or Firm* — Isaac J. Goodshaw

(57) ABSTRACT

A computer determines a degree of information duplication between at least two files included in an original pre-fetch list. The computer generates a re-ordered pre-fetch list by re-ordering the files included in the original pre-fetch list. The re-ordering is based, at least in part, on the degree of information duplication between the two files included in the original pre-fetch list. The files included in the original pre-fetch list are re-ordered by grouping files containing higher degrees of duplicate information closer together in the re-ordered pre-fetch list.

14 Claims, 5 Drawing Sheets

OPTIMIZED PRE-FETCH ORDERING USING DE-DUPLICATION INFORMATION TO ENHANCE NETWORK PERFORMANCE

FIELD OF THE INVENTION

The present invention relates generally to the field of network performance, and more particularly to enhancing network performance by optimizing pre-fetch ordering.

BACKGROUND OF THE INVENTION

Geographically distributed entities, such as a business with multiple local offices in different geographic locations, frequently desire to maintain a logically unified proprietary network that is accessible by all of the geographically distributed entities. To accomplish this, a wide area network (WAN) may be used to link the different locations.

Information technology (IT) managers within geographically distributed entities face the conflicting requirements of keeping costs in check while providing users with new and faster applications. This conflict is most acute on the WAN, where costs can be high and obtaining applications to perform well is hampered by limited bandwidth and high latency.

SUMMARY

A computer determines a degree of information duplication between at least two files included in an original pre-fetch list. The computer generates a re-ordered pre-fetch list by re-ordering the files included in the original pre-fetch list. The re-ordering is based, at least in part, on the degree of information duplication between the two files included in the original pre-fetch list. The files included in the original pre-fetch list are re-ordered by grouping files containing higher degrees of duplicate information closer together in the re-ordered pre-fetch list.

DETAILED DESCRIPTION

Figure 1:
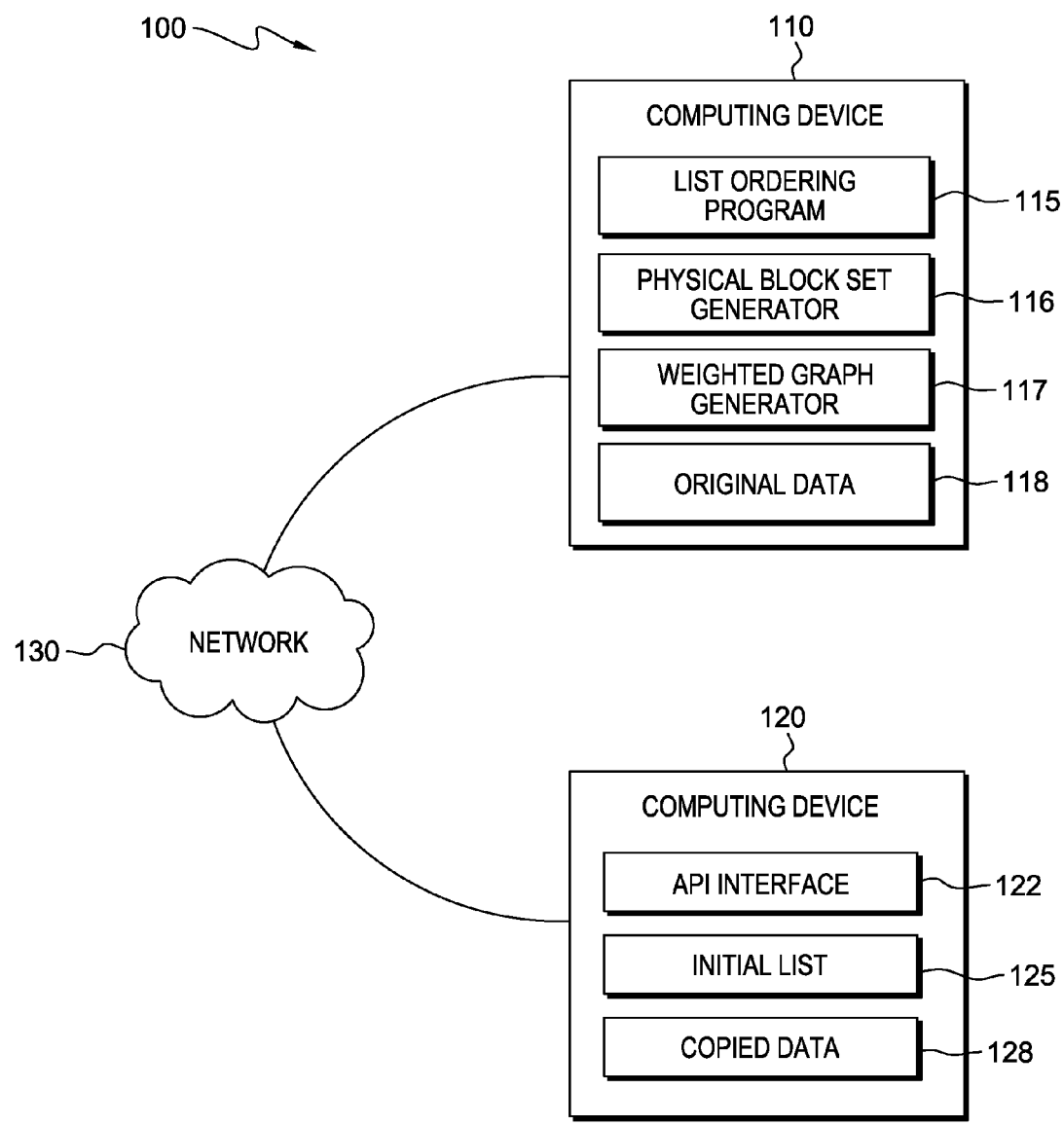
FIG. 1 is a functional block diagram illustrating a data trafficking environment, in accordance with an embodiment of the present invention.

In computing, data de-duplication is a specialized data compression technique for eliminating duplicate copies of repeating data. Related and somewhat synonymous terms are intelligent (data) compression and single-instance (data) storage. The technique is used to improve storage utilization and can also be applied to network data transfers to reduce the number of bytes that must be sent. In the de-duplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

This type of de-duplication is different from that performed by standard file-compression tools identify short repeated substrings inside individual files. The goal of storage-based data de-duplication is to inspect large volumes of data and identify large sections, such as entire files or large sections of files, which are identical, in order to store only one copy. The copy may be additionally compressed by single-file compression techniques.

One of the most common forms of data de-duplication implementations works by comparing chunks of data to detect duplicates. For that to happen, each chunk of data is assigned an identification, calculated by the software, typically using cryptographic hash functions. In many implementations, the assumption is made that if the identification is identical, the data is identical, even though this cannot be true in all cases due.

Other implementations do not assume that two blocks of data with the same identifier are identical, but actually verify that data with the same identification is identical. If the software either assumes that a given identification already exists in the de-duplication namespace or actually verifies the identity of the two blocks of data, depending on the implementation, then the software will replace that duplicate chunk with a link. Once the data has been de-duplicated, upon read back of the file, wherever a link is found, the system simply replaces that link with the referenced data chunk.

A clustered file system is a file system which is shared by being simultaneously mounted on multiple servers. Many computer clusters use clustered file systems. Servers are often underpinned by a clustered file system to control the complexity of the underlying storage environment used by the servers, which typically increases as servers are added to the computer cluster.

A shared disk file system uses a storage area network (SAN) to provide direct disk access from multiple computers at the block level. Translation from file-level operations, which applications use, to block-level operations used by the SAN must take place on the client node. A shared disk file system, a common type of clustered file system, adds a mechanism for concurrency control that gives a consistent view of the file system which can be serialized. The serialization of the file system reduces data corruption and unintended data loss even when multiple clients try to access the same files at the same time. Often shared disk file systems further employ a data fencing mechanism to prevent data corruption in case of node failures.

There are different architectural approaches to a shared disk file system since the underlying storage area network might use any of a number of known block-level protocols. Some shared disk file systems distribute file information across all the servers in a cluster (fully distributed). Other shared disk file systems utilize a centralized metadata server. Both approaches achieve the same result, i.e., enabling all servers to access all the data on a shared storage device.

In common with typical cluster file systems, a General Parallel File System (GPFS) is a high-performance shared-disk clustered file system. A GPFS provides concurrent, relatively high-speed, file access to applications executing on multiple nodes of clusters. In addition to providing file system storage capabilities, GPFS provides tools for management and administration of the GPFS cluster, and allows for shared access to file systems from remote GPFS clusters.

GPFS introduced the concept of file partitioning to accommodate the needs of parallel applications that run on high-performance multi-computers with parallel I/O subsystems. With partitioning, a file is not a sequence of bytes, but rather multiple disjoint sequences that may be accessed in parallel. The partitioning is such that it abstracts away the number and type of I/O nodes hosting the file system, and the partitioning allows a variety of logical partitioned views of files, regardless of the physical distribution of data within the I/O nodes. The disjoint sequences are arranged to correspond to individual processes of a parallel application, allowing for improved scalability.

GPFS has been successfully deployed for many commercial applications including: digital media, grid analytics and scalable file service. GPFS provides high performance by allowing data to be accessed over multiple computers at once. Many existing file systems are designed for a single server environment, and adding more file servers does not improve performance. In general, GPFS provides higher input/output performance by "striping" blocks of data from individual files over multiple disks, and reading and writing these blocks in parallel.

There are many approaches to help improve performance over the WAN portion of a network. These solutions may be based on a number of technologies, including data compression, data caching, application-specific acceleration, policy-based bandwidth allocation, and data pre-fetching.

Data pre-fetching, in particular, may be used to reduce the perceived latency (response time) of data being accessed over a WAN. In general, the phrase data pre-fetching may include requesting and retrieving data in advance of an actual user or application-level request. One problem encountered when pre-fetching data is the determination of what data to pre-fetch, as well as when and how frequently to perform the pre-fetching operation. Pre-fetching unnecessary data can result in wasted resources, while pre-fetching too infrequently can result in decreased performance for system users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The exemplary embodiments described herein are typically adapted for use in a GPFS cluster file system. However, this is not to be interpreted as a limitation. Other embodiments can be adapted for integration and use by different types of file systems.

FIG. 1 is a functional block diagram illustrating a data trafficking environment, generally designated 100, in accordance with one embodiment of the present invention. Data trafficking environment 100 includes computing device 110 and computing device 120.

In this exemplary embodiment, computing device 110 is connected to computing device 120 through network 130. Computing device 110 includes list reordering program 115, physical block set generator 116, weighted graph generator 117, and original data 118. Computing device 120 includes application programming interface (API) interface 122, initial list 125, and copied data 128. In exemplary embodiments, computing device 110 and computing device 120 may be included in General Parallel File System (GPFS) (not shown), which is included in data trafficking environment 100.

In various embodiments of the present invention, computing device 110 and computing device 120 are computing devices that can be standalone devices, servers, laptop computers, tablet computers, netbook computers, personal computers (PCs), or desktop computers. In another embodiment, computing device 110 and computing device 120 represent computing systems utilizing clustered computers and components to act as a single pool of seamless resources. In general, computing device 110 can be any computing device or a combination of devices with access to list reordering program 115, physical block set generator 116, weighted graph generator 117, and original data 118, and is capable of running list reordering program 115. In general, computing device 120 can be any computing device or a combination of devices with access to API interface 122, initial list 125, and copied data 128, and is capable of running API interface 122. Computing device 110 and computing device 120 may include internal and external hardware components, as depicted and described in further detail with respect to FIG. 5.

In this exemplary embodiment, list reordering program 115, physical block set generator 116, weighted graph generator 117, and original data 118 are stored on computing device 110. However, in other embodiments, list reordering program 115, physical block set generator 116, and weighted graph generator 117 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and list reordering program 115, physical block set generator 116, weighted graph generator 117, original data 118, and computing device 120 in accordance with a desired embodiment of the present invention.

Computing device 110 is, in exemplary embodiments, a home site included in a GPFS cluster file system. A home site is the source of an original data that is sent to other computing devices in response to a request for the original data, which is included in original data 118. Original data 118 includes, in general, original data, such as original pre-fetch file lists, virtual block lists,-and physical block sets, that are used by other programs, as well as other data such as re-ordered pre-fetch lists, and other data used by list reordering program 115, physical block set generator 116, and weighted graph generator 117.

Computing device 120 is, in exemplary embodiments, a cache site included in a GPFS cluster file system. Computing device 120 caches data locally in persistent data storage, i.e., saves the data as part of copied data 128, for use by other programs, for example, client applications. The other programs, or client applications, can be included in computing device 120 but are typically located externally on other computing devices that are in contact with computing device 120 via network 130. If a program, such as a client application, is requesting access to a file for the first time, then the file is fetched from the home site, e.g., computing device 110, and copied to GPFS file system at the cache site. Subsequent requests for the file are served from local cache site, thereby reducing the need for additional WAN bandwidth to transfer the same data repeatedly.

In exemplary embodiments, computing device 120 includes API interface 122. API interface 122 is an application programming interface (API) program that determines which requested files have overlaps. Since de-duplication is performed only on computing device 110, computing device 120 uses API interface 122 to re-order the pre-fetch list based on which requested files have overlaps. API interface 122 eliminates the need to perform de-duplication on the both the home site, e.g., computing device 110, and the cache site, e.g., computing device 120, for the same requested file.

In exemplary embodiments, in general, list reordering program 115 receives an initial list of requested files, which are included in initial list 125, from computing device 120. In response, list reordering program 115 activates physical block set generator 116 and weighted graph generator 117. Physical block set generator 116 generates a physical block set, and weighted graph generator 117 generates a weighted graph, for the blocks of data included in the requested files. The physical block set and weighted graph are utilized by list reordering program 115 to generate a re-ordered pre-fetch list for the requested files. The re-ordered pre-fetch list is then passed to computing device 120 which then reads the files following the order indicated by the re-ordered pre-fetch list.

A more detailed description of how list reordering program 115 re-orders a pre-fetch list is now described, in accordance with an exemplary embodiment. In general, list reordering program 115 re-orders the files included in an original pre-fetch list by grouping files that contain higher degrees of duplicate information closer together in a re-ordered pre-fetch list. After receiving a pre-fetch file list, list reordering program 115 determines a list of virtual blocks that are associated with the requested file. List reordering program 115 queries an integral de-duplication engine, i.e., the de-duplication engine is included in list reordering program 115, to generate a list of associated unique physical blocks. These associated unique physical blocks are added to a block set associated with the file. The block set for each file is compared with other file block sets, included in the pre-fetch list, to identify sets of common blocks. List reordering program 115 determines the degree of separation between at least two files included in the original pre-fetch list, i.e., number of files separating two given files included in the original pre-fetch list, and re-orders the pre-fetch file list to minimize the sending of duplicate physical blocks. In certain embodiments, the de-duplication engine is not integral to, but is accessible by, list reordering program 115.

A weighted graph is generated, by weighted graph generator 117, with a node representing a given file and the edges extending from the node representing the blocks shared with other files. The weight of an edge is assigned based on the number of common blocks shared among given pair of files. In the case of connected sub-trees, weight is assigned which is sum of weights of all edges in the sub-tree. For each sub-tree, ordered sub lists are created considering nodes in descending order of weight of edges associate with the given node. A new pre-fetch list is created by list reordering program 115 merging all the ordered sub-lists. In general, sub-lists are considered in the descending order of weights of their associated sub-trees while adding to a re-ordered pre-fetch list. The re-ordered pre-fetch list is passed to the cache site, computing device 120, which can read files in the specified file sequence indicated by the re-ordered pre-fetch list.

Figure 2:
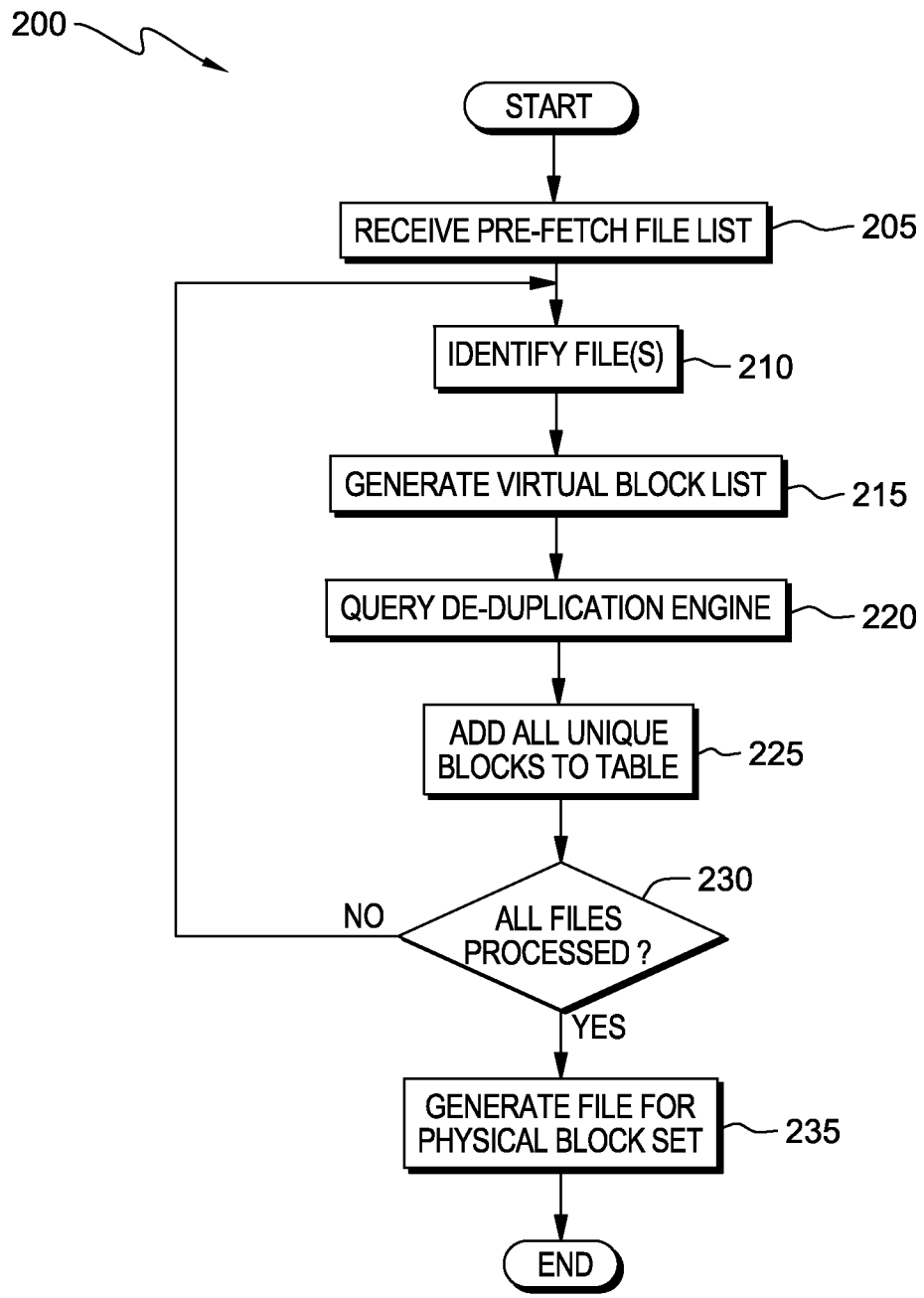
FIG. 2 illustrates operational steps of a physical block set generator, operating on a computing device within the data trafficking environment of FIG. 1, in accordance with an exemplary embodiment.

FIG. 2 is a flow chart, 200, illustrating the operational steps utilized physical block set generator 116 to generate a physical block set for the requested files to be transferred, in accordance with an exemplary embodiment.

In an exemplary embodiment, physical block set generator 116 receives an original pre-fetch file list in step 205. Typically, the pre-fetch file list is sent from computing device 120 to computing device 110, which passes the original pre-fetch file list to physical block set generator 116 and saves a copy of the original pre-fetch file list to original data 118. In other embodiments, physical block set generator 116 can generate the original pre-fetch file list after receiving a set of criteria from the cache site. The criteria can include information such as, the file names, and preferences for sending the files.

In an exemplary embodiment, in step 210, physical block set generator 116 identifies the files included in the original pre-fetch file list and then generates a virtual block list in step 215, which is saved as part of original data 118. The virtual block list is a list of the pieces of data, i.e., virtual blocks, that are included in the files included in the original pre-fetch file list. Physical block set generator 116 queries the de-duplication engine, included in list reordering program 115, to retrieve the physical blocks associated with each virtual block, in step 220. Then, in step 225, physical block set generator 116 populates a physical block set with all the unique physical blocks that were identified in step 220. In other words, only one copy of each physical block is added to the physical block set, even if the physical block exists in multiple files. For example, if files A and B both include virtual block "PT1567c", then only one copy of the physical block corresponding to virtual block "PT1567c" is added to the physical block set.

In an exemplary embodiment, in decision step 230, physical block set generator 116 determines if all the files have been processed, i.e., all the virtual and physical blocks have been processed for each file. If all the files have not been processed (decision step 230, no branch), i.e., the physical blocks included in each file have not been added to the physical block set, then physical block set generator 116 returns to step 210. If all the files have been processed (decision step 230, yes branch), i.e., the physical blocks included in each file exist have been added to the physical block set, then physical block set generator 116 proceeds to step 235. In step 235, physical block set generator 116 generates a file that includes the physical block set and saves the file as part of original data 118.

Figure 3:
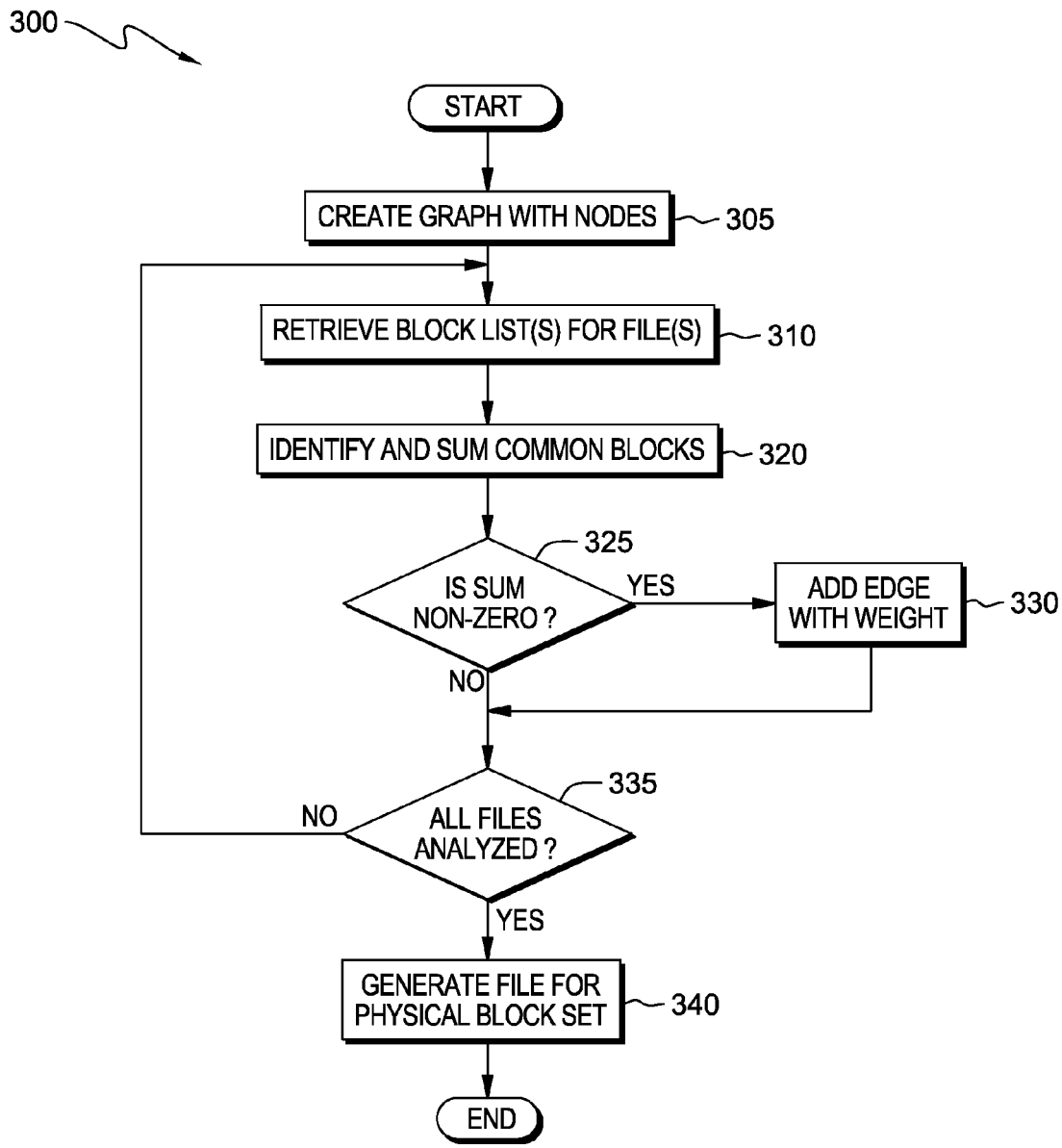
FIG. 3 illustrates operational steps of a weighted graph generator, operating on a computing device within the data trafficking environment of FIG. 1, in accordance with an exemplary embodiment.

FIG. 3 is a flow chart, 300, illustrating the operational steps utilized by weighted graph generator 117 to generate a weighted graph based on common blocks included in the requested files to be transferred, in accordance with an exemplary embodiment.

In an exemplary embodiment, weighted graph generator 117 begins creating a weighted graph by adding a node to the graph for each file, in step 305. In step 310, weighted graph generator 117 retrieves the virtual block list for each file from original data 118. Weighted graph generator 117 identifies the common blocks, i.e., virtual blocks included in both files, included in each file and sums them to create a weight between two respective files, in step 320. For example, files A and B both include virtual blocks "XY8904mH", "GT6754sR", and "WS3456dS", which each carry a weight of 1. Therefore, weighted graph generator 117 determines that the sum of the "weights" of the common virtual blocks is 3. The weight of three represents a numerical value applied the degree of overlap, or number of virtual blocks that are common, between the two files.

In an exemplary embodiment, weighted graph generator 117 determines if the sum, from step 320, of the virtual blocks is a non-zero value, in decision step 325. If the sum of the virtual blocks is a non-zero value, i.e., a number greater than zero, (decision step 325, yes branch), then weighted graph generator 117 proceeds to step 330. In step 330, weighted graph generator 117 adds an edge to the weighted graph that connects the two files. The edge has an assigned weight that corresponds to the sum value generated in step 320. After the edges have been added to connect the files, weighted graph generator 117 proceeds to decision step 335.

If the sum of the virtual blocks is not a non-zero value, i.e., is equal to zero, (decision step 325, no branch), then weighted graph generator 117 proceeds to decision step 335. In decision step 335, weighted graph generator 117 determines if all the virtual blocks included in files, which are included as part of original data 118, have been analyzed. In other words, weighted graph generator 117 determines if all the virtual blocks, included in all the files, have been analyzed i.e., had edges assigned and added to the weighted graph where applicable. If there are still files, i.e. virtual blocks, that have not been analyzed (decision step 335, no branch), then weighted graph generator 117 returns to step 310. If all the virtual blocks that have been analyzed (decision step 335, yes branch), then weighted graph generator 117 proceeds to step 340. In step 340, weighted graph generator 117 generates a file for the physical block set that includes the weighted graph and saves the file as part of original data 118.

Figure 4:
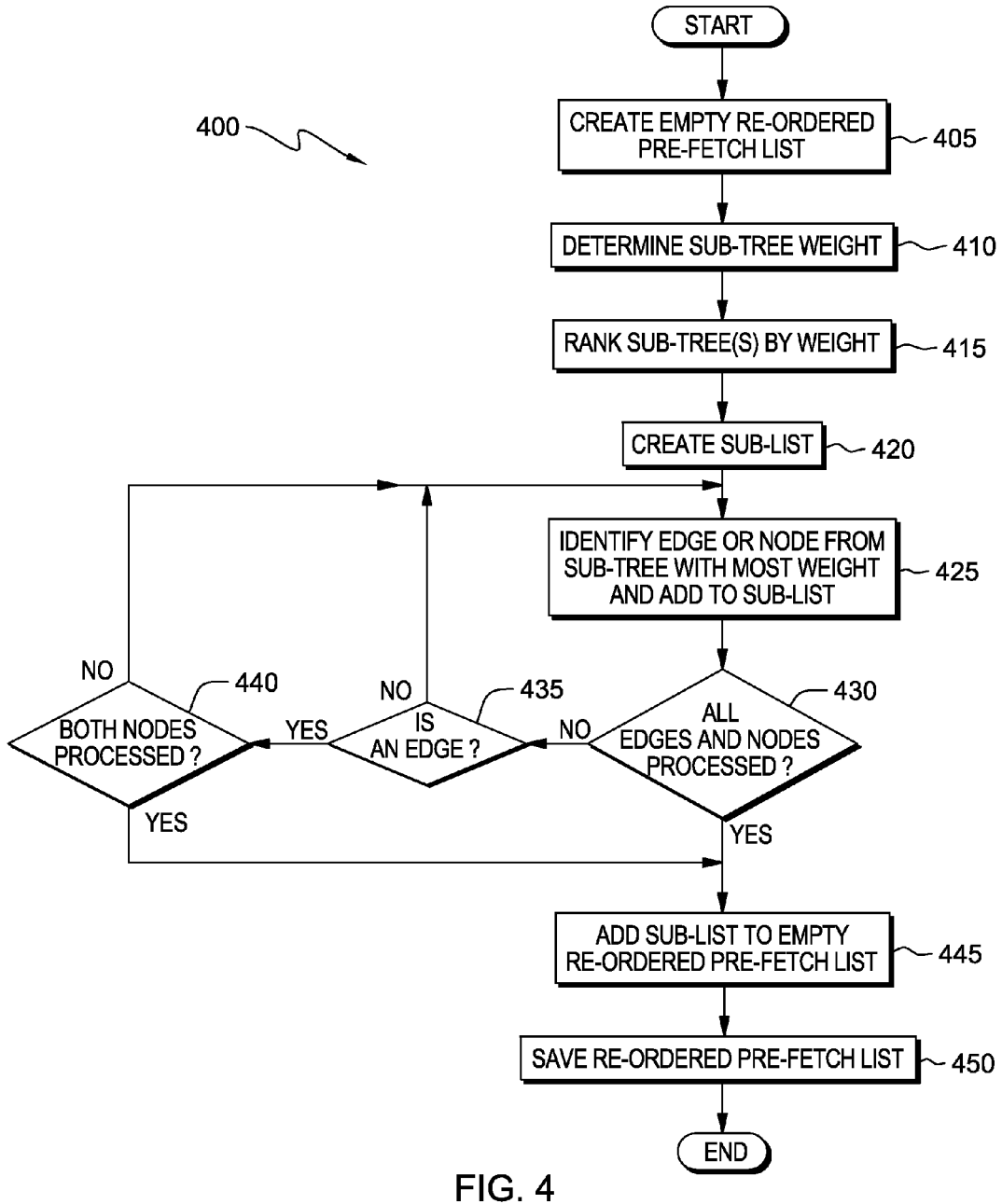
FIG. 4 illustrates operational steps of a list reordering program, operating on a computing device within the data trafficking environment of FIG. 1, in accordance with an exemplary embodiment.

FIG. 4 is a flow chart, 400, illustrating the operational steps utilized by list reordering program 115 to generate a re-ordered pre-fetch list for the requested files to be transferred, in accordance with an exemplary embodiment.

In an exemplary embodiment, list reordering program 115 creates an empty re-ordered pre-fetch list in step 405. Then list reordering program 115 retrieves the weighted graph from original data 118 and determines a weight of the sub tree(s) in step 410. In other words, list reordering program 115 sums the edges connected to each node (i.e., each file)

to determine the weight for that sub-tree. List reordering program 115 ranks the sub-tree(s) according to descending order of weight, in step 415.

In an exemplary embodiment, list reordering program 115 then creates an empty sub list for each sub-tree, in step 420. To fill an empty sub list for a sub tree, in step 425, list reordering program 115 adds the node with the highest rank to the sub list followed by the connected node(s), i.e., nodes that share an edge with the added node, according to highest edge weight. For example, a sub-tree for node A includes nodes B-E, which are connected to node A via weighted edges. The sub-tree for node A has the highest weight of all the sub-trees and node A is connected to node D with an edge that has the highest weight of all edges connected to node A. Therefore, list reordering program 115 adds node A into the first slot of the sub list and node D into the second slot. The remaining nodes, i.e. nodes B, C, and E, are then added to the sub list according their associated edge weight, i.e., the node with the highest associated edge weight to node A being added first. As such, if edge A-B has a weight of 4, edge A-C has a weight of 3, and edge A-E has a weight of 6, then the slots of the sub list would be filled as follows, A, D, E, B, and C.

In an exemplary embodiment, list reordering program 115 determines if all the edges and nodes included in the weighted graph have been processed, in decision step 430. If all the edges and nodes have been processed (decision step 430, yes branch) then list reordering program 115 proceeds to step 445. If there are any edges or nodes that have not been processed (decision step 430, no branch), then list reordering program 115 proceeds to decision step 435.

In an exemplary embodiment, list reordering program 115 determines if the unprocessed item is an edge, in decision step 435. If the unprocessed item is not an edge (decision step 435, no branch), i.e., the unprocessed item is a node, then list reordering program 115 returns to step 425. If the unprocessed item is an edge (decision step 435, yes branch), then list reordering program 115 determines if both of the nodes connected by the edge have both been processed, in decision step 440. If either of the nodes have not been processed (decision step 440, no branch), then list reordering program 115 returns to step 425. If both nodes have been processed (decision step 440, yes branch), then list reordering program 115 proceeds to step 445.

In an exemplary embodiment, in step 445, list reordering program 115 adds the sub lists to the empty re-ordered pre-fetch list. Then list reordering program 115 saves a copy of the filled re-ordered pre-fetch list as part of original data 118, in step 450.

In some embodiments, the re-ordering of data writes can also be performed using a substantially similar approach to that of re-ordering of a pre-fetch list (i.e., reads). Based on de-duplication information the blocks in a write request can be re-ordered as seen in the read request, e.g. the generation of a re-ordered pre-fetch list.

However, to perform a re-ordering of writes when utilizing file groups, the issue of write after write (WAW) data hazard must be addressed. File groups, expect updates to a set of independent files to be applied in a specific order. The issue of write order can be addressed through the inclusion of an appropriate set of techniques which can re-order the writes before they are written, e.g., by applying a set of techniques for memory disambiguation.

For example, writes for files A, B, and C are supposed to be written into respective slots 1, 2, and 3, within a file group environment. List reordering program 115 is applied and the files are thus sent in the order of B, C, and A. If a write were to be performed at this point then the files would not be written into their correct slots. However, through the application of techniques for memory disambiguation, the files can be written in the appropriate slot as they are received. In other words, file B is received first and is written to slot 2, then file C is received and written to slot 3, finally file A is received and is written to slot 1.

The exemplary embodiment(s) disclosed are not to be interpreted as a limitation to only those techniques and methods utilized by those exemplary embodiment(s). There are many possible ways in which a pre-fetch list and/or write list can be re-ordered. In other embodiments, the methods and techniques used to re-order a pre-fetch list and/or a write list can vary.

Figure 5:
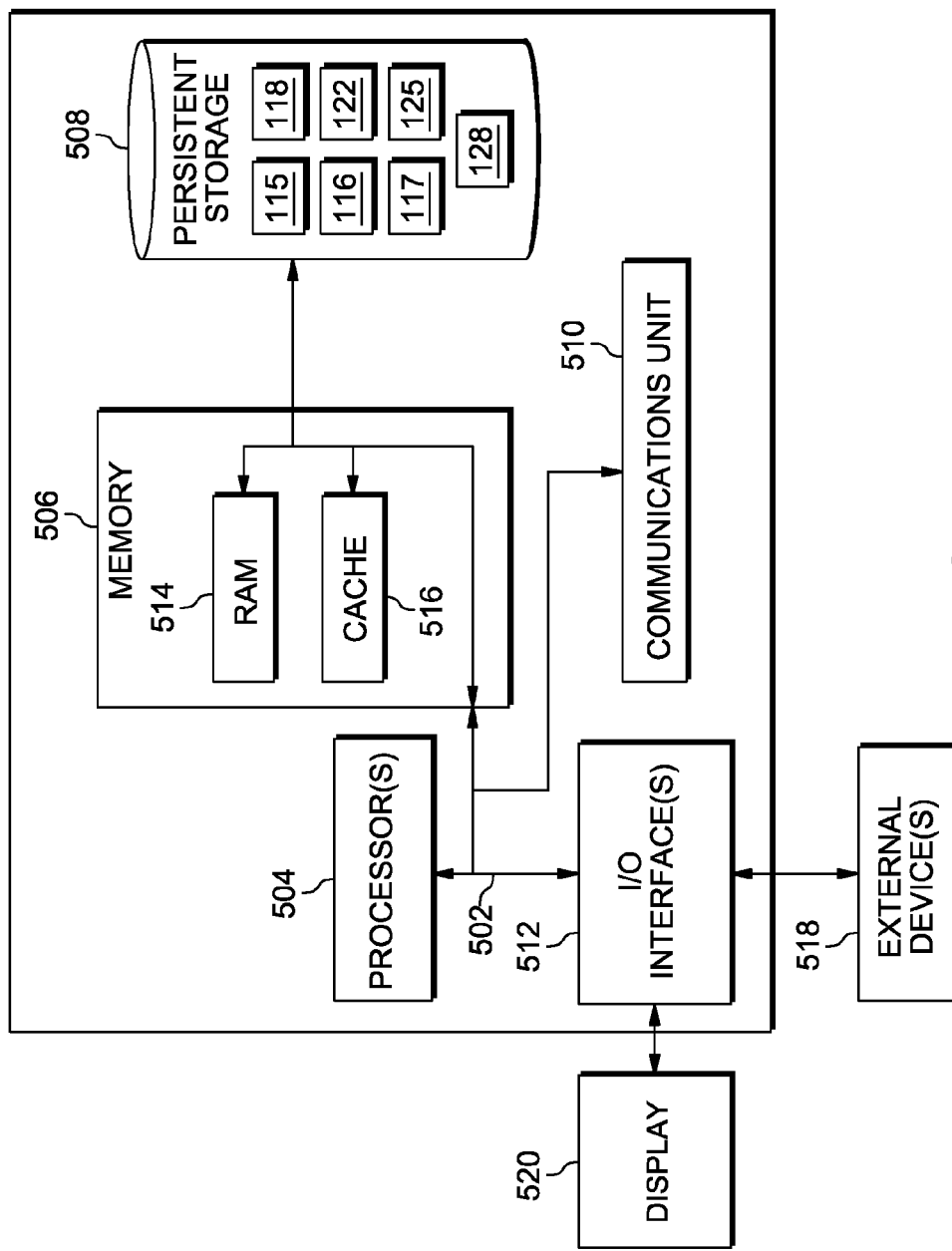
FIG. 5 depicts a block diagram of components of the computing device executing the list reordering program, in accordance with an embodiment of the present invention.

FIG. 5 depicts a block diagram of components of computing device 110 and computing device 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 and computing device 120 include respective communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

List reordering program 115, physical block set generator 116, weighted graph generator 117, original data 118, API interface 122, initial list 125, and copied data 128 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of computing device 120. In these examples, communications unit 510 includes one or more network interface cards. Communications unit 510 may provide communications through the use of either or both physical and wireless communications links. List reordering program 115, physical block set generator 116, weighted graph generator 117, original data 118, API interface 122, initial list 125, and copied data 128 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., list reordering program 115, physical block set generator 116, weighted graph generator 117, original data 118, API interface 122, initial list 125, and copied data 128 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of optimizing an order of a pre-fetch list, the method comprising:
   a computer determining a degree of information duplication between at least two files included in an original pre-fetch list;
   the computer generating a re-ordered pre-fetch list by re-ordering the files included in the original pre-fetch list based, at least in part, on the degree of information duplication between the two files included in the original pre-fetch list, wherein the files included in the original pre-fetch list are re-ordered by grouping files containing higher degrees of duplicate information closer together in the re-ordered pre-fetch list;
   the computer generating a weighted graph, wherein a node of the weighted graph is associated with a file included in the original pre-fetch list;
   the computer connecting two or more nodes with a weighted edge wherein the weighted edge represents the degree of information duplication between two files respectively associated with the nodes;
   the computer determining a weight for each sub-tree included in the weighted graph, wherein the weight for each sub-tree is based, at least in part, on a sum of weighted edges included in the sub-tree;
   the computer generating an ordered sub list of nodes included in the sub-tree, wherein the ordered sub list of nodes is based, at least in part on, the weight of at least one edge associate with a given node; and
   the computer generating a new pre-fetch list based, at least in part, on one or more sub-lists, wherein the sub-lists are added to the new pre-fetch list based on their associated sub-tree weights.

2. The method of claim 1, the method further including:
   the computer determining a degree of separation between at least two files included in the original pre-fetch list that represents a number of files separating two given files included in the original pre-fetch list; and
   the computer generating a re-ordered pre-fetch list by re-ordering the files included in the original pre-fetch list based, at least in part, on the degree of separation between the two files included in the original pre-fetch list.

3. The method of claim 1, the method further including:
   the computer creating a virtual block list for at least one file included in the original pre-fetch list; and
   the computer comparing the virtual block list of two or more files included in the original pre-fetch list.

4. The method of claim 1, the method further including:
   the computer generating a list of unique physical blocks included in the two or more files included in the original pre-fetch list.

5. The method of claim 3, the method including:
   the computer analyzing the virtual block list to identify one or more nodes to be included in a weighted graph.

6. A computer program product for optimizing an order of a pre-fetch list, the computer program product comprising:
   one or more computer-readable storage-medium and program instructions stored on the one or more computer-readable storage medium, the program instructions comprising:
   program instructions to determine a degree of information duplication between at least two files included in an original pre-fetch list;
   program instructions to generate a re-ordered pre-fetch list by re-ordering the files included in the original pre-fetch list based, at least in part, on the degree of information duplication between the two files included in the original pre-fetch list, wherein the files included in the original pre-fetch list are re-ordered by grouping files containing higher degrees of duplicate information closer together in the re-ordered pre-fetch list;
   program instructions to generate a weighted graph, wherein a node of the weighted graph is associated with a file included in the original pre-fetch list;
   program instructions to connect two or more nodes with a weighted edge wherein the weighted edge represents the degree of information duplication between two files respectively associated with the nodes;

program instructions to determine a weight for each sub-tree included in the weighted graph, wherein the weight for each sub-tree is based, at least in part, on a sum of weighted edges included in the sub-tree;

program instructions to generate an ordered sub list of nodes included in the sub-tree, wherein the ordered sub list of nodes is based, at least in part on, the weight of at least one edge associate with a given node; and program instructions to generate a new pre-fetch list based, at least in part, on one or more sub-lists, wherein the sub-lists are added to the new pre-fetch list based on their associated sub-tree weights.

7. The computer program product of claim 6, the program instructions further including:

program instructions to determine a degree of separation between at least two files included in the original pre-fetch list that represents a number of files separating two given files included in the original pre-fetch list; and program instructions to generate a re-ordered pre-fetch list by re-ordering the files included in the original pre-fetch list based, at least in part, on the degree of separation between the two files included in the original pre-fetch list.

8. The computer program product of claim 6, the program instructions further including:

program instructions to create a virtual block list for at least one file included in the original pre-fetch list; and program instructions to compare the virtual block list of two or more files included in the original pre-fetch list.

9. The computer program product of claim 6, the program instructions further including:

program instructions to generate a list of unique physical blocks included in the two or more files included in the original pre-fetch list.

10. The computer program product of claim 8, the program instructions further including:

program instructions to analyze the virtual block list to identify one or more nodes to be included in a weighted graph.

11. A computer system for optimizing an order of a pre-fetch list, the computer system comprising:

one or more computer processors;

one or more computer readable storage medium;

program instructions stored on the computer readable storage medium for execution by at least one of the one or more processors, the program instructions comprising:

program instructions to determine a degree of information duplication between at least two files included in an original pre-fetch list;

program instructions to generate a re-ordered pre-fetch list by re-ordering the files included in the original pre-fetch list based, at least in part, on the degree of information duplication between the two files included in the original pre-fetch list, wherein the files included in the original pre-fetch list are re-ordered by grouping files containing higher degrees of duplicate information closer together in the re-ordered pre-fetch list;

program instructions to generate a weighted graph, wherein a node of the weighted graph is associated with a file included in the original pre-fetch list;

program instructions to connect two or more nodes with a weighted edge wherein the weighted edge represents the degree of information duplication between two files respectively associated with the nodes;

program instructions to determine a weight for each sub-tree included in the weighted graph, wherein the weight for each sub-tree is based, at least in part, on a sum of weighted edges included in the sub-tree;

program instructions to generate an ordered sub list of nodes included in the sub-tree, wherein the ordered sub list of nodes is based, at least in part on, the weight of at least one edge associate with a given node; and program instructions to generate a new pre-fetch list based, at least in part, on one or more sub-lists, wherein the sub-lists are added to the new pre-fetch list based on their associated sub-tree weights.

12. The computer system of claim 11, the program instructions further including:

program instructions to determine a degree of separation between at least two files included in the original pre-fetch list that represents a number of files separating two given files included in the original pre-fetch list; and program instructions to generate a re-ordered pre-fetch list by re-ordering the files included in the original pre-fetch list based, at least in part, on the degree of separation between the two files included in the original pre-fetch list.

13. The computer system of claim 11, the program instructions further including:

program instructions to create a virtual block list for at least one file included in the original pre-fetch list;

program instructions to compare the virtual block list of two or more files included in the original pre-fetch list, and program instructions to generate a list of unique physical blocks included in the two or more files included in the original pre-fetch list.

14. The computer system of claim 13, the program instructions further including:

program instructions to analyze the virtual block list to identify one or more nodes to be included in a weighted graph.

* * * * *